Figure 1:
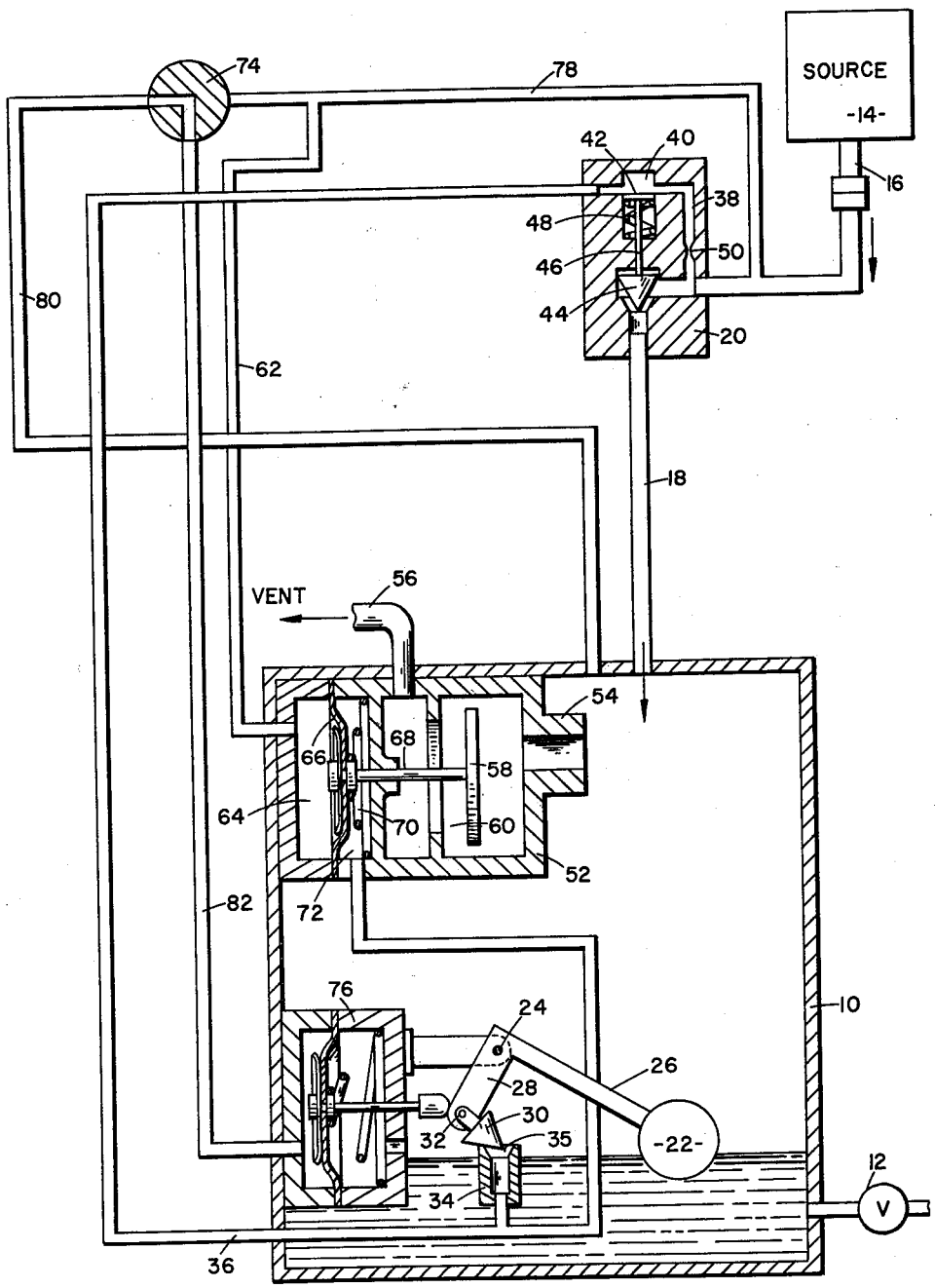

INVENTOR.
HARVISON C. HOLLAND

INVENTOR.
HARVISON C. HOLLAND

United States Patent Office 3,075,543
Patented Jan. 29, 1963

3,075,543
FLOAT ACTUATED VENT AND REPLENISHING
VALVES FOR A LIQUID CONTAINER
Harvison C. Holland, Santa Monica, Calif., assignor to
North American Aviation, Inc.
Filed Feb. 27, 1961, Ser. No. 91,674
11 Claims. (Cl. 137—390)

This invention concerns fluid pressure flow regulating method and means for insuring that a closed liquid container will not be overstressed or overfilled while liquid is being supplied thereto from an external source. While the teachings set forth herein are applicable to a variety of diverse liquids, containers, and installations, this invention is especially applicable to rapid replenishing of large tanks such as installed in aerial or space vehicles to hold fuel or other liquids.

Vehicles of the stated type are characterized by powerful engines requiring a large quantity of fuel which is contained in a plurality of tanks distributed within the vehicle wings and fuselage as necessary to balance their weight about a stable center. To avoid the time-consuming process of filling each such tank individually, it is common practice to interconnect them so that complete servicing of all tanks may be accomplished through a single fuel inlet line incorporating a single liquid level control valve. Additional interconnections are also provided between each tank and a common vent or breather line tending to equalize atmospheric pressure in the tanks with external pressure surrounding the vehicle during flight.

To minimize the time consumed in pumping the large quantity of fuel involved in servicing vehicles of the stated type, relatively high pressures and flow rates are maintained during the replenishing operation. Consequently, if air is not properly vented from each fuel tank during refueling thereof, compression of this air as a result of rapid flow of liquid into the tank may create a sudden and dangerous condition of excessive force upon the tank walls and structure connected thereto. In addition, immediate and positive closure of the main liquid level control valve when the tanks are filled to normal capacity is essential in avoiding the hazards which would otherwise result. For example, a brief momentary delay in terminating the refueling flow after the tanks are filled could result either in rupture of the tank, or in spillage of fuel through the vent line in an amount sufficient to create an extremely serious fire hazard.

In view of the criticality of the level control valve in promptly terminating the inlet flow when necessary, accurate and reliable means for testing the stated valve to determine its operability are commensurately important. Of the various methods known to the prior art for testing valves to insure their proper operation, use of electrically actuated devices is least appropriate in the environment described above, in view of the volatile and explosive nature of many modern fuels or their fumes, and the risk of arcing in such devices or the circuits in which they must be connected.

Accordingly, it is a principal object of the invention disclosed herein to provide an improved liquid replenishing flow system incorporating automatic means to prevent overfilling or overstressing of such system.

It is a further object of the invention disclosed herein to provide apparatus as set forth in these objects, the operation of which is automatic in response to the initiation or termination of liquid flow into said container.

It is an additional object in this case to provide improved means for testing apparatus as set forth in these objects to determine its functionality.

It is a further object in this case to provide apparatus as set forth in the preceding object resulting in improved safety and convenience in its operation.

Figure 2:
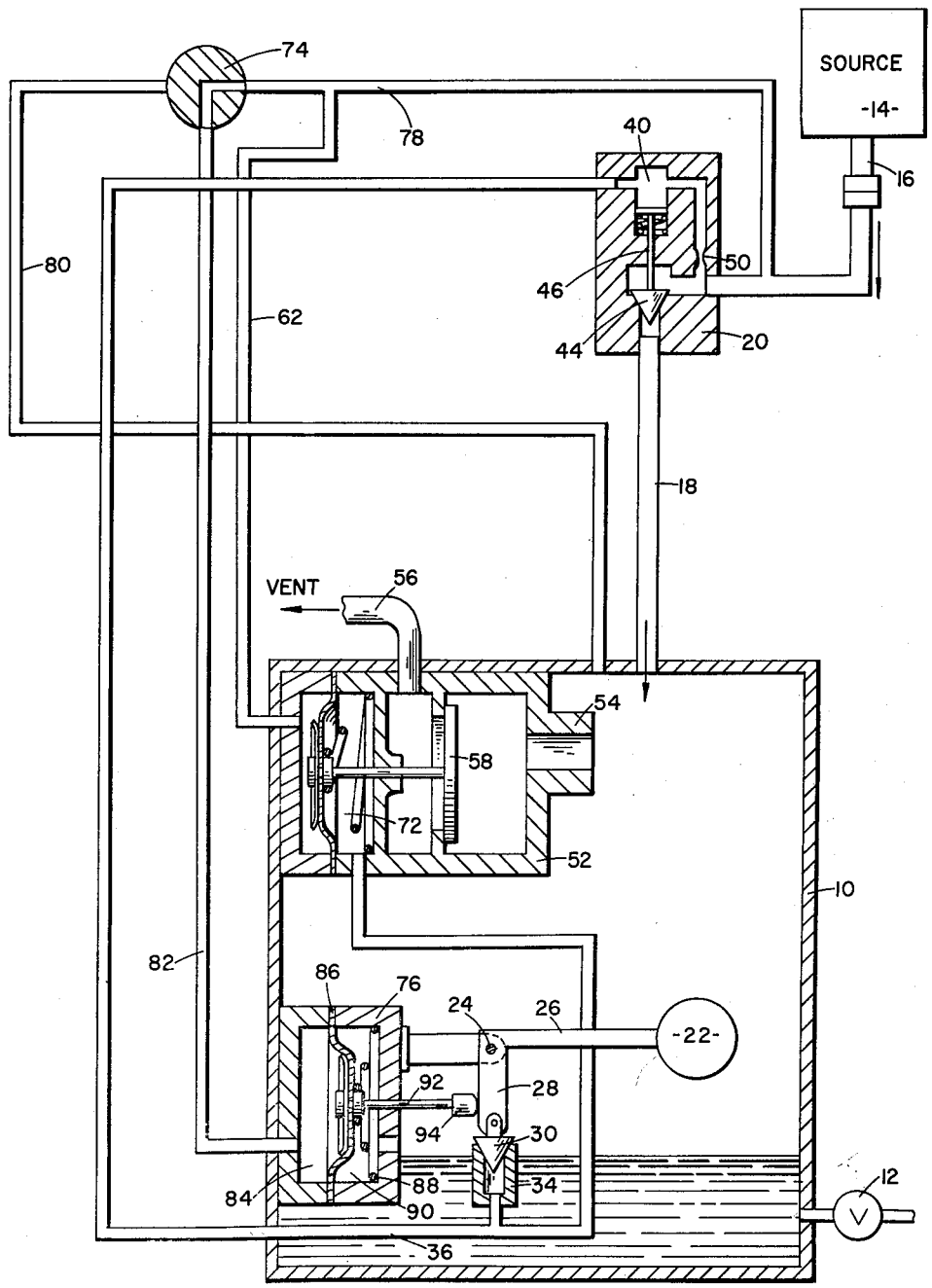

Other objects and advantages of the instant invention will become apparent upon a close reading of the following detailed description of an illustrative embodiment of the invention, reference being had to the accompanying drawings, wherein:

FIGURE 1 shows an illustrative embodiment of the inventive concept disclosed herein with components in the operative position characterizing a normal tank filling operation, and FIGURE 2 shows a view corresponding to FIGURE 1 with components shown in the operative position characterizing testing of the main liquid level control and venting valves to determine their functionality.

With reference to the drawings described above and particularly to FIGURE 1, the invention disclosed herein may be seen to include liquid containing means in the form of tank 10, the purpose or environment for which is not material to the scope of this invention. In any case, flow means 12 for flow of liquid out of tank 10 may include conduits, valves, or similar devices, the function of which results in lowering the liquid level in tank 10 so that periodic replenishing thereof from a suitable source 14 is necessary. To this end, conduit means in the form of supply line 16 and inlet line 18 are provided connecting source 14 with tank 10 through a main liquid level control valve 20, the operation of which either initiates or terminates replenishing liquid flow from conduit 16 into conduit 18 and thence into tank 10.

Operation of main control valve 20 to open or close the same is controlled by liquid level sensing means in the form of float 22 which is buoyantly supported near the surface of the liquid in tank 10 as shown by FIGURE 1. As the liquid level rises during replenishing of tank 10, float 22 moves upwardly in an arc about pivot means 24 upon which float supporting arm 26 is pivotally mounted. Float supporting arm 26 is integrally joined or otherwise affixed to a plug actuating lever 28 to which plug means which may take the form of conical member 30 is pivotally secured at 32. Conical plug 30 is operatively related to fluid escape means in the form of cup 34 which is connected to a fluid pressure control conduit 36 so that fluid within conduit 36 may flow into cup 34 and escape through an opening 35 at the upper end thereof provided that plug 30 is withdrawn or otherwise not seated in uniform contact with the entire periphery of the stated opening. During flow of liquid into tank 10, conduit 36 is continuously supplied with a portion of such liquid through passage 38 in valve 20, this passage interconnecting conduit 36 with supply line 16 through a hollow chamber 40 also contained in valve 20.

Chamber 40 is formed by a cylindrical wall within which a piston 42 is slidably engaged with respect thereto. Piston 42 is connected to flow control means which may take the form of plug 44 to which the piston is connected by a rod 46.

Resilient means in the form of spring 48 bears upon one side of piston 42, tending to move plug 44 to the open position against the force of pressure within chamber 40 acting upon the opposite side of piston 42. When fluid pressure within chamber 40 acting upon piston 42 in opposition to spring 48 builds up sufficiently, the spring force is overcome and plug 44 moves to the closed position in which flow from supply line 16 to conduit 18 is prevented. Fluid pressure within chamber 40 is continuously maintained whenever source 14 is connected to supply line 16, since conduit 38 communicates line 16 with the stated chamber regardless of whether any flow occurs into tank 10. However, the amount of pressure in chamber 40 is less than that required to close valve 20, since the flow into chamber 40 through conduit 38 is accompanied by simultaneous fluid flow out of the stated chamber at an equal or greater rate through conduit 36 and opening 35 in cup 34, past plug 30 whenever the plug is in the displaced condition shown by FIGURE 1. An orifice 50 may be provided as shown in conduit 38 to insure that flow into chamber 40 will not exceed the rate at which flow occurs out of chamber 40.

From the disclosure of structure thus far described, it may be understood that the action of the liquid in tank 10 during the replenishing operation causes gradual upward movement of float 22, resulting in blockage of opening 35 in cup 34 by movement of plug 30 into the seated or plugging position. Since no other escape is possible, closure of cup 34 in the stated manner causes pressure in conduit 36 and chamber 40 to increase under the influence of the inlet fluid flow through passage 38. When the stated pressure becomes sufficiently great to overcome the force of spring 48, piston 42 is moved in a direction resulting in closure of valve 20 by seating of plug 44, blocking passage of liquid from supply line 16 into conduit 18. By appropriate arrangement and sizing of parts, closure of opening 35 by movement of plug into the fully seated position is arranged to occur only when float 22 has achieved a position coincident with the highest level of liquid desired in tank 10. Thus, plug 30 normally remains in a displaced position with respect to opening 35 during the replenishing operation, and becomes fully seated when float 22 has achieved the position indicative of a full tank. Immediately upon achieving the stated full condition, the resulting build-up of pressure in conduit 36 and chamber 40 causes automatic closure of main control valve 20 to prevent the addition of any more liquid such as would result in overstressing or overfilling of the tank.

In further connection with the replenishing operation, it may be seen from FIGURE 1, for example, that venting means are provided to permit release of air and fumes or other gases within tank 10 which would otherwise be compressed in the absence of such means, resulting in overstressing of the tank walls or conceivably preventing the entrance of replenishing liquid flow into the tank. The stated venting means include an automatic replenishing vent valve 52 which communicates with the interior of tank 10 through a conduit 54 and with the exterior of tank 10 through conduit 56. Communication between conduits 54 and 56 is controlled by a closure member 58 operatively related to an opening 60 within vent valve 52 whereby flow from conduit 54 to conduit 56 may be prevented or blocked by member 58 contacting the periphery of opening 60 and blocking passage therethrough.

Valve 52 is operatively related to valve 20 in a manner resulting in automatic venting of tank 10 whenever source 14 is connected to conduit 16 at the start of the replenishing operation, and automatic termination of venting at the conclusion of such operation. Thus, conduit 62 connected to conduit 78 results in the application of inlet liquid flow to a chamber 64 containing a diaphragm 66 against which the pressure of such liquid is applied. Upon the application of this pressure, movement of the diaphragm occurs toward the right as seen in FIGURE 1 resulting in similar movement of closure member 58 due to interconnection of the diaphragm with the stated member by means of rod 68 affixed to each of the stated elements at either end thereof. Movement of closure member 58 in the manner just described unseats the member thereby permitting intercommunication between conduit 54 and conduit 56 through opening 60. Resilient means in the form of spring 70 normally biases closure member 58 toward the closed position whereby opening 60 is covered by the member and communication between the stated conduits is thereby prevented. When float 22 achieves a position commensurate with the liquid level characteristic of a full tank, thereby moving plug 30 into plugging relationship within cup 34 as discussed hereinabove, the resulting build-up of pressure in conduit 36 which causes automatic closure of main control valve 20 as described above is also communicated to chamber 72 due to interconnection of conduit 36 therewith as shown by FIGURE 1, for example. Increase of pressure in chamber 72 from the stated cause results in the application of force against diaphragm 66 which combines with the force of spring 70, the total force exceeding that caused by liquid pressure in chamber 64, with the result that diaphragm 66 moves toward the left as seen in FIGURE 1, the consequent movement of closure member 58 resulting in closure of vent valve 52 by blockage of opening 60.

Due to the importance of insuring positive and immediate closure of main control valve 20 when the liquid level in tank 10 reaches a maximum permissible level at the conclusion of the replenishing operation, means are further provided in the inventive structure disclosed herein for testing operation of main control valve 20 to determine its proper functionality at times other than when its proper operation is critical. Thus, the stated means comprising valve 74 and diaphragm member 76 combine operatively to produce in effect a false indication of a liquid level characterizing a fully replenished tank. To this end, pressure line 78 is connected between supply line 16 and valve 74 while drain line 80 is connected between tank 10 and the stated valve. Valve 74 may be positioned to connect either pressure line 78 or drain line 80 with line 82 connected between valve 74 and diaphragm member 76.

Referring now to FIGURE 2, valve 74 is shown in the position connecting pressure line 78 with line 82, thereby communicating the pressure in line 78 with chamber 84 in diaphragm member 76. Pressurization of chamber 84 results in the application of force against diaphragm 86 causing its movement toward the right as seen in FIGURE 2 against the force of a spring 88 contained within chamber 90 which normally biases the diaphragm toward the left. Movement of diaphragm 86 toward the right causes corresponding movement of rod 92 attached to the diaphragm at its center and similar movement of bearing member 94 affixed to rod 92 at the end opposite from diaphragm 86. Movement of bearing portion 94 toward the right as shown by comparison of FIGURES 1 and 2 causes rotation of plug actuating lever 28 counterclockwise about pivot 24 resulting in alignment of plug 30 within opening 35 in cup 34 which blocks escape of liquid in conduit 36 through the stated opening, and incidentally raises float 22 to the position shown by FIGURE 2 reflecting that position normally assumed by the float when tank 10 is full.

As a result of the actuation of diaphragm member 76 in the manner stated above, movement of float 22 to the position normally identified with a full tank and simultaneous blockage of opening 35 by plug 30 causes buildup of pressure in conduit 36 and chamber 40 to terminate the flow of inlet liquid from source 14 by closing main control valve 20 in precisely the same manner that such inlet flow would be terminated if tank 10 were filled as at the conclusion of the replenishing operation.

In addition to closing main control valve 20, build-up of pressure in conduit 36 resulting from actuation of diaphragm member 76 in the manner described above also results in closure of vent valve 52, since the pressure in conduit 36 is communicated to chamber 72 and applies force against diaphragm 66 which combines with the force of spring 70 to move closure member 58 into covering relationship over opening 60 as described above. Thus, it may be seen that actuation of diaphragm member 76 tests the functionality of vent valve 52 as well as that of main control valve 20. For example, if diaphragm 66 were ruptured, flow from line 62 into conduit 36 would occur through the diaphragm, and would combine with the flow normally occurring into conduit 36 from line 16 through chamber 40. The combined rates of flow into conduit 36 would exceed the maximum escape flow rate out of line 36 permitted by opening 35, thus overloading the flow capacity of the stated opening even when plug 30 is displaced as shown in FIGURE 1, with the result that pressure would build up in conduit 36. Since the pressure in conduit 36 is communicated to chamber 40, an increase of pressure from the stated cause in chamber 40 would cause closure of valve 20, preventing further replenishing of tank 10 until the faulty diaphragm 66 is replaced with a new part.

After proper operation of the replenishing system components has been determined by actuation of diaphragm member 76 as described above, valve 74 may be rotated to the position shown by FIGURE 1 wherein line 82 is connected to drain line 80, permitting liquid in chamber 84 to drain directly into tank 10 through valve 74, whereupon diaphragm 86 is moved toward the left and assumes the position shown in FIGURE 1. Movement of diaphragm 86 in the stated manner is accompanied by leftward movement of bearing portion 94 so that force is no longer applied by bearing portion 94 against plug actuating lever 28, and the weight of float 22 causing it to lower to the floating position at the surface of the liquid in tank 10 causes clockwise rotation of float supporting arm 26 and plug actuating lever 28 about pivot 24. Rotation of the stated members as thus referred to withdraws plug 30 slightly from cup 34, displacing the plug as shown by FIGURE 1 and again permitting escape of fluid from conduit 36 through opening 35.

From the description of structure and the operation thereof discussed above, it may be understood that operation of valve 74 may be selectively accomplished at any time during the liquid replenishing operation to determine the operability of mechanical components in the replenishing system with respect to their operating sequence in terminating the tank filling operation. Valve 74 may also be used as an emergency or selective shut-off means in the event that it is desired to terminate the flow of incoming liquid through conduit 18 for any reason before the normal conclusion of the replenishing operation.

It will be understood by those skilled in the art that many various types of valves and flow controlling devices having suitable functional characteristics might be used in the replenishing system disclosed herein, and that the schematic showing of devices in the drawings serves primarily to illustrate functional relationships. Thus, diaphragm operated valves such as used as main control valves in some aircraft installations are obviously adaptable for use in place of valve 20. Moreover, pistons could be used in place of diaphragms in items 52 and 76, for example. However, it is an important feature of the invention disclosed herein that diaphragm member 76, vent valve 52, and components operatively related thereto function entirely by means of hydraulic pressure and without electrical power or circuitry of any kind.

In connection with consideration of the inventive teachings set forth herein as applied to aircraft, the advantage of providing a separate vent for use during the replenishing operation in addition to the normal flight vent line mentioned above has long been recognized by aircraft designers. This advantage derives from the fact that venting of air and fuel vapors which would otherwise be entrapped in fuel tanks during replenishing thereof may require larger vent lines and connections than those necessary for equalizing pressure in the tanks with external atmospheric pressure during flight. Thus, provision of a separate and relatively simpler vent system for use only during the replenishing operation permits use of a smaller and lighter flight vent line than would otherwise be necessary. In addition, design considerations in the case of a particular airplane may not permit efficient venting of all fuel tanks by the flight vent line during the replenishing operation. Thus, for example, if the wing tanks or any portion thereof are higher than the fuselage tanks when the airplane is in a normal position of rest supported by its landing gear, separate vents may be necessary for venting certain portions of the wing tanks during the replenishing operation. However, use of separate replenishing vent lines has been severely hampered due to spillage of fuel through such lines during taxiing of the airplane on the ground. Float operated valves which close a replenishing vent line when the fuel tanks are full are unsuitable since such valves open as soon as the fuel level in the tank is lowered by movement of the fuel away from the valve for any reason such as sloshing, for example, or normal usage of the fuel to supply the engine. Float operated valves are also unsuitable because forces tending to close such valves are relatively slight and neither positive nor rapid in action, and their operation is accordingly erratic or otherwise unreliable.

Since replenishing vent valve 52 as described above remains closed at all times except during the replenishing operation, at the conclusion of which closure of the valve is positive and fully automatic, it will be understood that use of the stated valve permits incorporation of a separate replenishing vent system in aircraft which avoids the problems incident to such lines as attempted in the prior art. Additionally, fuel vent valve 52 as disclosed herein is opened by force resulting from the application of pressure against diaphragm 66, the stated pressure being supplied by the incoming flow of replenishing liquid with the result that valve action is positive and automatic. In contrast to the function just described, float operated valves having mechanical linkages actuated by the float are subject to sticking, delayed or sluggish operation and other undesirable characteristics which render them unsuitable. A further advantage of the system disclosed herein resides in the fact that valve 74 as suggested by the showing of FIGURES 1 and 2 may be remotely located with respect to those devices the operation of which is tested by movement of valve 74, with the result that valve 74 may be located wherever necessary to provide maximum convenience of the user.

While the particular structural details set forth above and in the drawings are fully capable of attaining the objects and providing the advantages herein stated, the structure thus disclosed is merely illustrative and could be varied or modified to produce the same result without departing from the scope of the inventive concept as defined in the appended claims.

I claim:

1. A replenishing system for flowing liquid into a container comprising; a container for liquids, a separate source for supplying such liquid, flow control valve means including a valve responsive to a pressure signal indicative of a predetermined liquid level in said container, said signal causing closure of said valve, liquid level sensing means for sensing the actual liquid level in said container and providing said pressure signal when said actual liquid level corresponds to said predetermined liquid level, first conduit means for communicating said pressure signal to said flow control valve means, second conduit means connecting said source and said container through said valve so that flow from said source to said container is prevented by closure of said valve, vent valve means including a valve intercommunicating the airspace within said container with surrounding atmosphere externally thereof, vent valve means further including pressure responsive means for automatically opening said valve to vent said airspace when flow occurs from said source into said container, fluid pressure actuated means for initiating said pressure signal when said actual liquid level differs from said predetermined liquid level whereby said valve means closes in response to said signal, and selectively operable means for applying fluid pressure to said fluid pressure actuated means and said pressure responsive means to determine the functionality of said flow control valve means and said vent valve means.

2. The structure set forth in claim 1 above in which said fluid pressure actuated means includes a diaphragm connected to a bearing member operatively related to said float, whereby pressure on one side of said diaphragm raises said float to the position occupied by said flow when buoyantly supported by liquid at said predetermined level, thereby initiating said pressure signal.

3. The structure set forth in claim 1 above in which said pressure responsive means includes a diaphragm connected to a closure member operatively related to an opening in said valve, resilient means biasing said diaphragm toward the position in which said opening is covered by said closure member, and third conduit means connecting said second conduit means with said vent valve means whereby flow from said source to said container causes application of pressure to said diaphragm in a direction opposite from the biasing force of said resilient means whereby said closure member uncovers said opening to vent said container.

4. The structure set forth in claim 1 above wherein said flow control valve means includes a chamber, a piston therein, said piston joined to a valve plug and movable therewith, resilient means biasing said piston and said plug toward the valve open position, and passage means communicating said first conduit means with said chamber whereby buildup of pressure in said first conduit means causes said pressure to close said valve by moving said piston against the biasing force of said resilient means.

5. A replenishing system for flowing liquid into a container comprising in combination; a container for liquid, a separate source for such liquid, flow control valve means including a valve responsive to a pressure signal indicative of a predetermined liquid level in said container, said signal causing closure of said valve, liquid level sensing means for sensing the actual liquid level in said container and providing said pressure signal when said actual liquid level corresponds with said predetermined liquid level, said liquid level sensing means including a float buoyantly supported on the surface of said liquid, first conduit means for communicating said pressure signal to said flow control means, second conduit means connecting said source and said container through said valve so that flow from said source to said container is prevented by closure of said valve, fluid pressure actuated means including a diaphragm connected to a bearing member operatively related to said float whereby pressure on one side of said diaphragm raises said float to the position occupied by said float when buoyantly supported by liquid at said predetermined level thus initiating said pressure signal, vent valve means including a valve intercommunicating the airspace within said container with surrounding atmosphere externally thereof, said vent valve means further including pressure responsive means for automatically opening said valve to vent said container when flow occurs from said source to said container, said pressure responsive means including a chamber containing a diaphragm connected to a closure member operatively related to an opening in said vent valves, resilient means biasing said diaphragm toward the position in which said opening is covered by said closure member and third conduit means for applying pressure against said diaphragm causing movement thereof in a direction opposite from the biasing force of said resilient means whereby said opening is uncovered by said closure member, and selectively operable means for applying fluid pressure to said first and second diaphragms to determine the functionality of said flow control valve means and said vent valve means, said selectively operable means comprising a valve connected between a fluid pressure source and each of said first and second diaphragms.

6. In a replenishing system for flowing liquid into a container form an external source, a main control valve connected between said source and said container for initiating and for terminating the flow of said liquid under pressure from said source, first conduit connection means separably connecting said source to said main control valve, second conduit connection means between said main control valve and said container, a vent valve intercommunicating the airspace within said container with surrounding atmosphere externally thereof, pressure responsive means operatively related to said vent valve for automatically opening said valve to vent said airspace in response to liquid pressure, and third conduit connection means between said pressure responsive means and said first conduit connection means for communicating the liquid pressure in said first conduit connection means to said pressure responsive means to cause said vent valve to open automatically when said liquid pressure is applied to said main control valve by connection of said external source therewith.

7. The structure set forth in claim 6 above wherein said pressure responsive means includes a diaphragm connected to a closure member operatively related to an opening in said vent valve, resilient means biasing said diaphragm toward the position in which said opening is covered by said closure member, and said third conduit connection means is connected to apply liquid pressure against said diaphragm causing movement thereof in a direction opposite from the biasing force of said resilient means whereby said opening is uncovered by said closure member to permit venting of said container.

8. The structure set forth in claim 7 above including in addition thereto, selectively operable means for applying liquid pressure against said diaphragm in a direction coinciding with the biasing force of said resilient means whereby said vent valve is closed.

9. The structure set forth in claim 8 above wherein said selectively operable means includes a valve connected between a fluid pressure source and said pressure responsive means whereby pressure may be applied from said source to said diaphragm.

10. In a replenishing system for flowing liquid into a container from an external source; vent valve means including a valve intercommunicating the airspace within said container with surrounding atmosphere externally thereof, said vent valve means further including pressure responsive means for automatically opening said valve to vent said airspace when flow occurs from said source to said container, and for automatically closing said valve when no flow occurs from said source to said container, said pressure responsive means including a diaphragm connected to a closure member operatively related to an opening in said vent valve, resilient means biasing said diaphragm toward the position in which said opening is covered by said closure member, and conduit means for applying fluid pressure against said diaphragm causing movement thereof in a direction opposite from the biasing force of said resilient means whereby said opening is uncovered by said closure member to permit venting of said container, and selectively operable means for applying fluid pressure against said diaphragm in a direction coinciding with the biasing force of said resilient means whereby said vent valve is closed.

11. The structure set forth in claim 10 above wherein said selectively operable means includes a valve connected between a fluid pressure source and said pressure responsive means whereby pressure may be applied from said source to said diaphragm.

References Cited in the file of this patent

UNITED STATES PATENTS

| 993,628 | Williams | May 30, 1911 |
|---|---|---|
| 1,302,538 | Gulick | May 6, 1919 |
| 1,355,746 | Justus | Oct. 12, 1920 |
| 2,748,799 | Rath | June 5, 1956 |
| 2,780,234 | Russell | Feb. 5, 1957 |
| 2,780,236 | Russell | Feb. 5, 1957 |